United States Patent
Wilkey et al.

(10) Patent No.: US 10,279,917 B1
(45) Date of Patent: May 7, 2019

(54) PIVOTING CABLE ACTUATING MECHANISM

(71) Applicant: B/E Aerospace, Inc., Winston-Salem, NC (US)

(72) Inventors: Robert D. Wilkey, Atlanta, GA (US); Alexander N. Pozzi, Winston-Salem, NC (US); Francis Xavier L. Garing, Atlanta, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/938,471

(22) Filed: Mar. 28, 2018

(51) Int. Cl.
*B64D 11/06* (2006.01)
*F16C 1/16* (2006.01)
*F16C 1/14* (2006.01)

(52) U.S. Cl.
CPC .............. *B64D 11/064* (2014.12); *F16C 1/14* (2013.01); *F16C 1/16* (2013.01)

(58) Field of Classification Search
CPC .............. B64D 11/064; B64D 11/0644; B64D 11/0639; A47C 1/0325; A47C 1/0244; A47C 1/0248; A47C 1/024; B60N 2/20; B60N 2/10; B60N 2/6671; G05G 7/10; F16C 1/101; F16C 1/16; F16C 1/18; F16C 1/145; F16C 1/14; F16C 1/12; F16C 1/108; Y10T 74/2045; Y10T 74/20456; Y10T 74/20462; Y10T 74/20396; Y10T 74/20402; Y10T 74/20408; Y10T 74/2042; Y10T 74/20426
See application file for complete search history.

(56) References Cited

U.S. PATENT DOCUMENTS

| 2,445,711 | A | * | 7/1948 | Fitch | A61F 2/58 623/58 |
| 3,224,808 | A | * | 12/1965 | Spielman | A47C 1/0325 297/341 |
| 4,588,226 | A | * | 5/1986 | Young | A47C 3/18 248/425 |
| 4,671,572 | A | * | 6/1987 | Young | A47C 3/18 248/425 |
| 4,856,762 | A | * | 8/1989 | Selzer | F16F 9/0209 267/64.12 |
| 5,671,972 | A | * | 9/1997 | Tedesco | A47C 3/30 297/361.1 |
| 2014/0191553 | A1 | * | 7/2014 | Blendea | B60N 2/929 297/354.1 |

(Continued)

FOREIGN PATENT DOCUMENTS

DE      102004052747 B3 *  3/2006  ............... B60N 2/20

*Primary Examiner* — Daniel D Yabut

(74) *Attorney, Agent, or Firm* — Clements Bernard Walker PLLC

(57) ABSTRACT

A cable actuating mechanism that actuates through a central pivot axis of a pivoting mechanism including two articulating cable actuators that contact opposing ends of a floating pin that passes through the center of the pivot. One actuator is affixed to a stationary assembly of the pivot device and the other actuator is affixed to a rotating body of the device. A first cable pulled at one end of the device pulls a second cable at an opposing end of the device through the articulating cable actuators. The cable actuating mechanism can be used to unlock a seat recline lock device in an aircraft seat equipped with a pivoting armrest, among other applications.

18 Claims, 15 Drawing Sheets

(56) References Cited

U.S. PATENT DOCUMENTS

| | | | |
|---|---|---|---|
| 2015/0274038 A1* | 10/2015 | Garing | B60N 2/231 |
| | | | 74/89.2 |
| 2016/0167788 A1* | 6/2016 | Thomaschewski | B64D 11/064 |
| | | | 297/344.1 |
| 2017/0015422 A1* | 1/2017 | Garing | B64D 11/0639 |
| 2017/0050734 A1* | 2/2017 | Becker | B64D 11/064 |
| 2018/0312084 A1* | 11/2018 | Does | B60N 2/22 |

* cited by examiner

PIVOTING CABLE ACTUATING MECHANISM

BACKGROUND

The inventive concepts disclosed herein relate generally to a cable actuating mechanism that actuates through a central pivot axis of a pivoting mechanism, and more particularly, to a mechanism including two articulating cable actuators that contact opposing ends of a floating pin passing through a center of a pivot, one actuator being affixed to a rotating component and the other actuator being affixed to a fixed component, thereby allowing a first cable segment of the rotating component to actuate cable translation of a second separate cable segment of the fixed component through the pivoting mechanism. The mechanism finds particular application, for example, in the pivot of an aircraft seat armrest, allowing a cable from the seat recline button to connect to a seat recline lock device without requiring that the cable be routed outside of the pivot area, thus preventing wear and failure of the cable over cycling of the pivot of the armrest.

Aircraft passenger seats are commonly equipped with pivoting armrests and seat recline functionality. Seat recline is typically controlled by a push button actuator mechanism located in the armrest for actuating a remote recline lock device to cause the seatback to be repositioned from an upright position to a reclining position. The push button actuator is typically coupled to one end of a cable such that pushing of the button is converted to a pulling force on the cable. The other end of the cable is typically connected to the recline lock device which unlocks the recline lock device in response to application of a pulling force from the cable.

The remote location of the push button actuator from the recline lock device, along with the requirement for certain armrests to pivot for stowing, necessitates routing the cable around the armrest pivot to avoid wear on the cable over repeated cycling of the armrest pivot, disadvantageously increasing the space needed in the pivot area to accommodate cable routing.

Therefore, what is needed is a mechanism that can be used in the pivot of an aircraft seat armrest that allows the cable from the seat recline button to connect to the seat recline lock device without requiring that the cable be routed outside of the pivot area. Such a mechanism would prevent wear and failure of the cable, as well as decrease the amount of space needed in the pivot area to accommodate cable routing thereby reducing armrest width.

SUMMARY

To achieve the foregoing and other aspects and advantages, in one embodiment the inventive concepts disclosed herein are directed to a cable actuating mechanism including a first articulating cable actuator affixed to a rotating assembly including a first cable coupled at one end to the first articulating cable actuator and at an opposing end to an actuator configured to apply a pulling force on the first cable, a second articulating cable actuator affixed to a stationary assembly including a second cable coupled at one end to the second articulating cable actuator and at an opposing end to a device responsive to a pulling force on the second cable, and a pivoting mechanism including a floating pin disposed through a center of a pivot shaft coupling the rotating assembly and the stationary assembly, the first articulating cable actuator contacting one end of the floating pin and the second articulating cable actuator contacting an opposing end of the floating pin such that pulling force on the first cable pulls the second cable to actuate the device.

In a further aspect, pulling force on the first cable articulates the first articulating cable actuator to move the floating pin to articulate the second articulating cable actuator causing the second cable to be pulled.

In another aspect, the first articulating cable actuator may be pivotally attached to the rotating assembly and the second articulating cable actuator may be pivotally attached to the stationary assembly.

In another aspect, the pivoting mechanism may further include a damper configured to dampen rotation of the pivoting mechanism.

In another aspect, the mechanism operates consistently regardless of an angular position of the rotating assembly relative to the stationary assembly.

In another aspect, the first cable may be a jacketed cable, a naked cable, or a rod.

In another aspect, the second cable may be a jacketed cable and a jacket of the jacketed cable may be fixed at one end to the stationary assembly.

In another aspect, the pivoting mechanism may further include at least one additional actuator for actuating a second device.

In another aspect, the actuator may be a push button, the rotating assembly may be an armrest, the stationary assembly may be a seat spreader, and the device may be a hydraulic lock configured to unlock in response to pulling force from the second cable.

In another embodiment, the inventive concepts disclosed herein are directed to an aircraft seat recline cable actuating mechanism including a first articulating cable actuator affixed to a rotating armrest including a first cable coupled at one end to the first articulating cable actuator and at an opposing end to an actuator configured to apply a pulling force on the first cable, a second articulating cable actuator affixed to a stationary assembly including a second cable coupled at one end to the second articulating cable actuator and at an opposing end to a seat recline lock device responsive to a pulling force on the second cable, and a pivoting mechanism including a floating pin disposed through a center of a pivot shaft coupling the rotating armrest and the stationary assembly, the first articulating cable actuator contacting one end of the floating pin and the second articulating cable actuator contacting an opposing end of the floating pin such that pulling force on the first cable pulls the second cable to actuate the seat recline lock device.

In a further aspect, the pivoting mechanism further includes at least one additional actuator for actuating a device having a function different from a function of the seat recline lock device.

In a further aspect, the actuator may be a push button and the stationary assembly may be a seat spreader.

In a further aspect, a total width across the rotating armrest and the stationary assembly may be less than 8 cm.

In a further aspect, a total width across the rotating armrest and the stationary assembly may be less than 5 cm.

DESCRIPTION OF THE DRAWINGS

Features, aspects and advantages of the present invention are understood when the following detailed description of the invention is read with reference to the accompanying drawings, in which.

DETAILED DESCRIPTION OF EXEMPLARY EMBODIMENTS

The inventive concepts disclosed herein are generally directed to a cable actuating mechanism that actuates through a central pivot axis of a pivoting mechanism, for example, a pivoting armrest of an aircraft passenger seat. The pivoting mechanism can be freely rotating or have an element that dampens the rotation of the pivoting mechanism. The mechanism utilizes two articulating cable actuators that contact opposing ends of a floating pin passing through the center of the pivot. One articulating cable actuator is pivotably attached to the rotating component of the pivot device, and the other articulating cable actuator is pivotably attached to the stationary component of the pivot device.

When a first cable at one end of the device is pulled, the articulating cable actuator attached to the first cable pushes the floating pin into the articulating cable actuator at the other end of the device, which in turn pulls on the second cable, effectively translating the motion from the first cable into the second cable. Because the two articulating cable actuators are attached to different bodies, for example one rotating and the other fixed, the mechanism operates the same regardless of the angular position of the two bodies relative to one another.

Compared to a prior art single cable required to be routed around and outside of the pivoting elements, the present mechanism allows the cable to be split, with one cable connected to the rotating side of the pivot and the other cable connected to the stationary side of the mechanism. Both cable housings can be fixed in place within their respective assemblies, thereby preventing damage or wear on the cable housings.

In a non-limiting example, the cable housing connecting to the recline lock of an aircraft seat can be fixed in place when cycling the pivot of the armrest. Additionally, the cable connecting the recline actuator on a pivoting armrest can be housing free, saving cost and weight.

Figure 1:
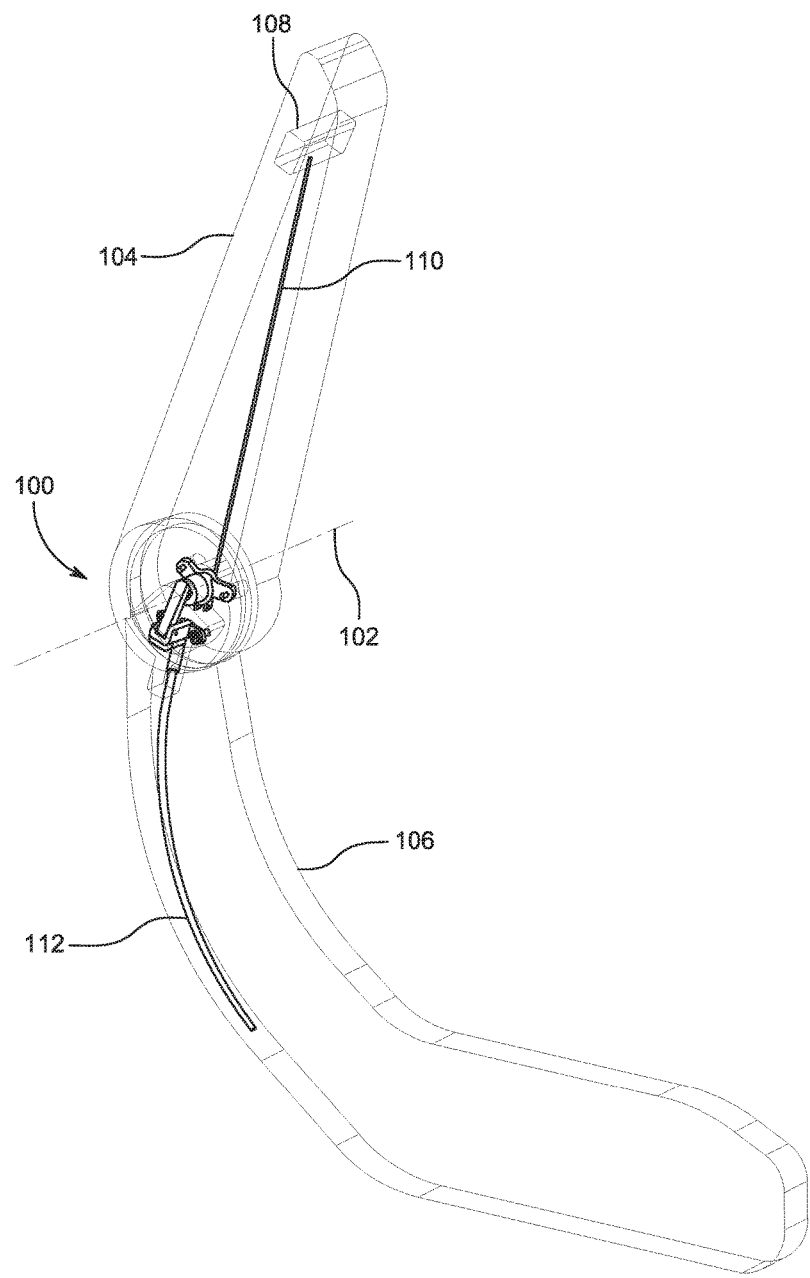
FIG. 1 is a perspective view of a pivoting armrest assembly configured with seatback release functionality and showing the armrest raised.
Figure 2:
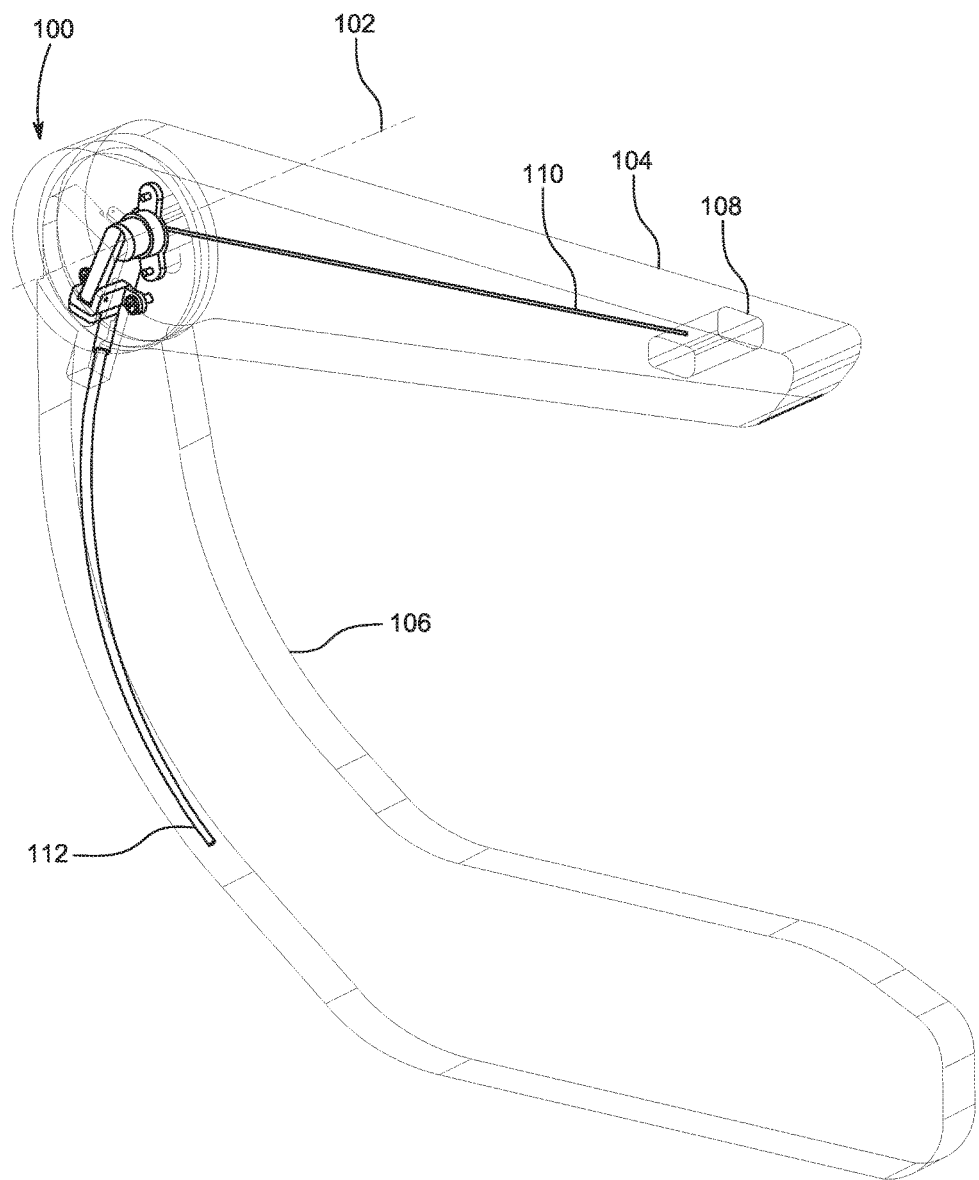
FIG. 2 is a perspective view of the armrest assembly of FIG. 1 showing the armrest lowered.

Referring to FIGS. 1 and 2, the cable actuating mechanism 100 is shown utilized in an armrest pivot to unlock a remote recline lock of an aircraft seatback. The cable actuating mechanism 100 actuates through a central pivot axis 102 of a pivoting armrest. The cable actuating mechanism 100 utilizes two articulating cable actuators arranged to contact opposing ends of a floating pin passing through the center of the pivot axis 102. The first articulating cable actuator is pivotably attached to a rotating armrest 104, and the second articulating cable actuator is pivotably attached to the stationary seat spreader 106.

An actuator 108, for example a push button actuator, is actuated to pull one end of a first cable 110 of the rotating armrest 104 in a direction of the actuator 108. Pulling the end of the first cable 110 causes the first articulating cable actuator to push the floating pin into the articulating cable actuator of the seat spreader 106, which in turn pulls one end of a second cable 112 of the seat spreader 106, effectively translating the motion from the first cable 110 into the second cable 112. Because the first articulating cable actuator is attached to the rotating armrest 104, and the second articulating cable actuator is attached to the stationary seat spreader 106, the cable actuating mechanism 100 operates consistently regardless of the angular position of the rotating armrest 104 relative to the seat spreader 106. For example, the cable actuating mechanism 100 operates consistent in both the raised or stowed position of the rotating armrest 104 as shown in FIG. 1, and the lowered or deployed position of the rotating armrest 104 as shown in FIG. 2. The actuator 108 operable for pulling the first cable 110 can be any conventional mechanical or assisted actuator.

Figure 3:
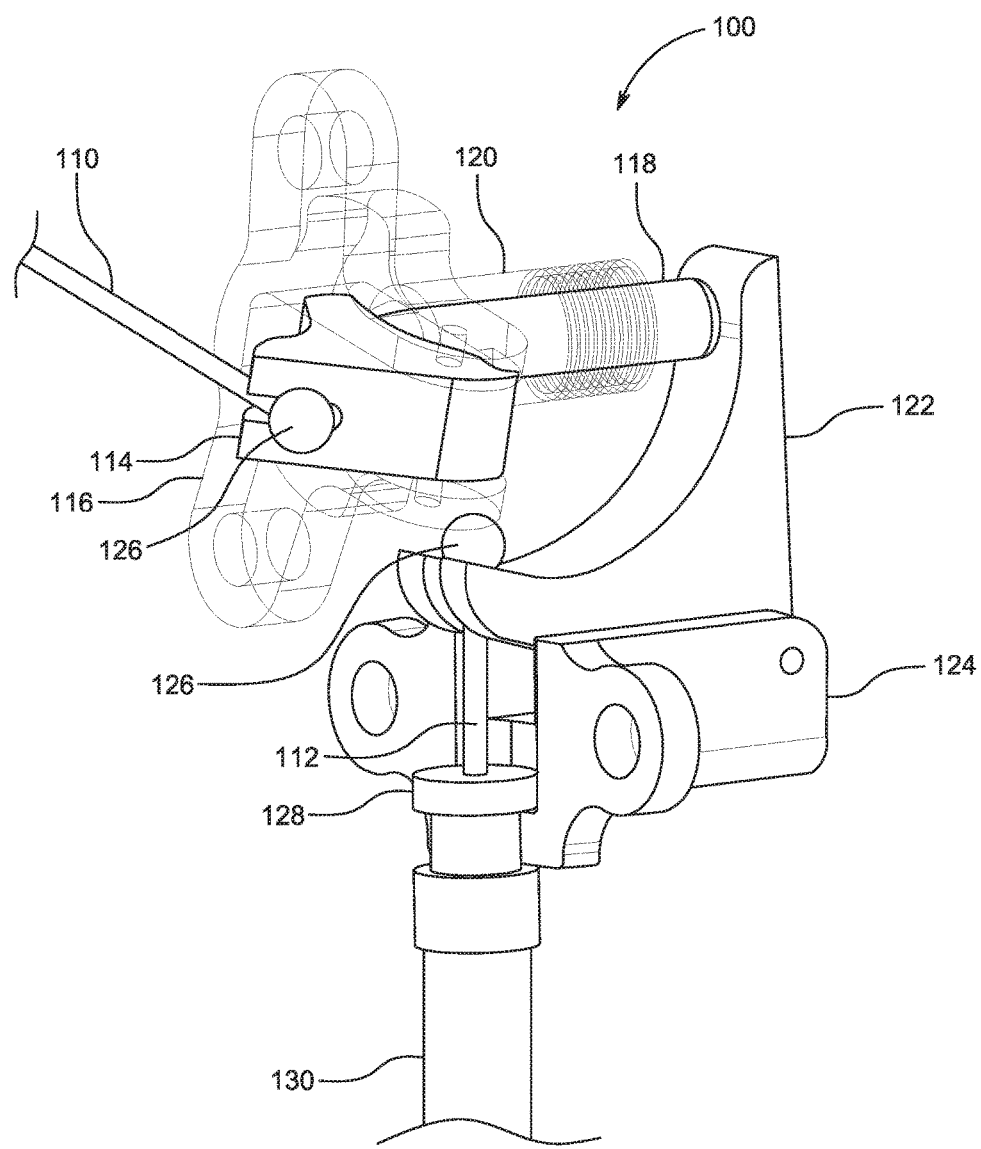
FIG. 3 is a fragmentary perspective view of a cable actuating mechanism shown actuated and with a rotating component shown in a first position.

Referring to FIG. 3, portions of the cable actuating mechanism 100 are shown without the rotating armrest and stationary seat spreader for clarity. The first articulating cable actuator 114 is pivotably attached to a first component 116 affixed to the rotating component, for example the rotating armrest. The first articulating cable actuator 114 pivots relative to the first component 116 about a pivot axis. The first articulating cable actuator 114 engages a floating pin 118 slidably disposed within a pivot shaft 120 of the armrest pivot. In this arrangement, pulling the end of the first cable 110 remote from the first articulating cable actuator 114 causes the first articulating cable actuator 114 to pivot relative to the first component 116, thereby driving the floating pin 118 into contact with the second articulating cable actuator 122.

The second articulating cable actuator 122 is pivotably attached to a second component 124 affixed to the stationary component, for example the seat spreader. The second articulating cable actuator 122 pivots relative to the second component 124 about a pivot axis in response to the pushing force from the floating pin 118, thereby pulling one end of the second cable 112, translating the motion from the first cable 110 into the second cable 112.

The first and second cables 110, 112 can be cables, hydraulic hoses, rods, chains, etc. In a particular embodiment, at least one of the first and second cables 110, 112 can be a Bowden-style cable generally including a protective sheath, an inner sleeve, and an inner wire. Translation of the inner wire relative to the inner sleeve transmits the pulling force on the first articulating cable actuator 114 in the case of the first cable 110, and on seat recline lock in the case of the second cable 112. The ends of the first and second cables 110, 112 that engage with the respective first and second articulating cable actuators 114, 112 can terminate in a cylindrical nipple 126. The cable-engaging ends of the first and second articulating cable actuators 114, 122 can be split so that the cables 110, 112 are routed through the respective ends. Pulling the first cable 110 causes the nipple end of the first cable 110 to pull on the first articulating cable actuator 114 to move the floating pin 118 and push the second articulating cable actuator 122 to cause the second articulating cable actuator 122 to pull the nipple end of the second cable 112.

In a particular embodiment, the first cable 110 can be an unjacketed cable or rod, and the second cable can be a Bowden-style cable wherein a ferrule 128 and cable jacket 130 are retained by engagement with the second component 124 such that the inner cable of the second cable 112 translates relative to the ferrule 128 and cable jacket 130 in response to pulling motion from the second articulating cable actuator 122.

Figure 4:
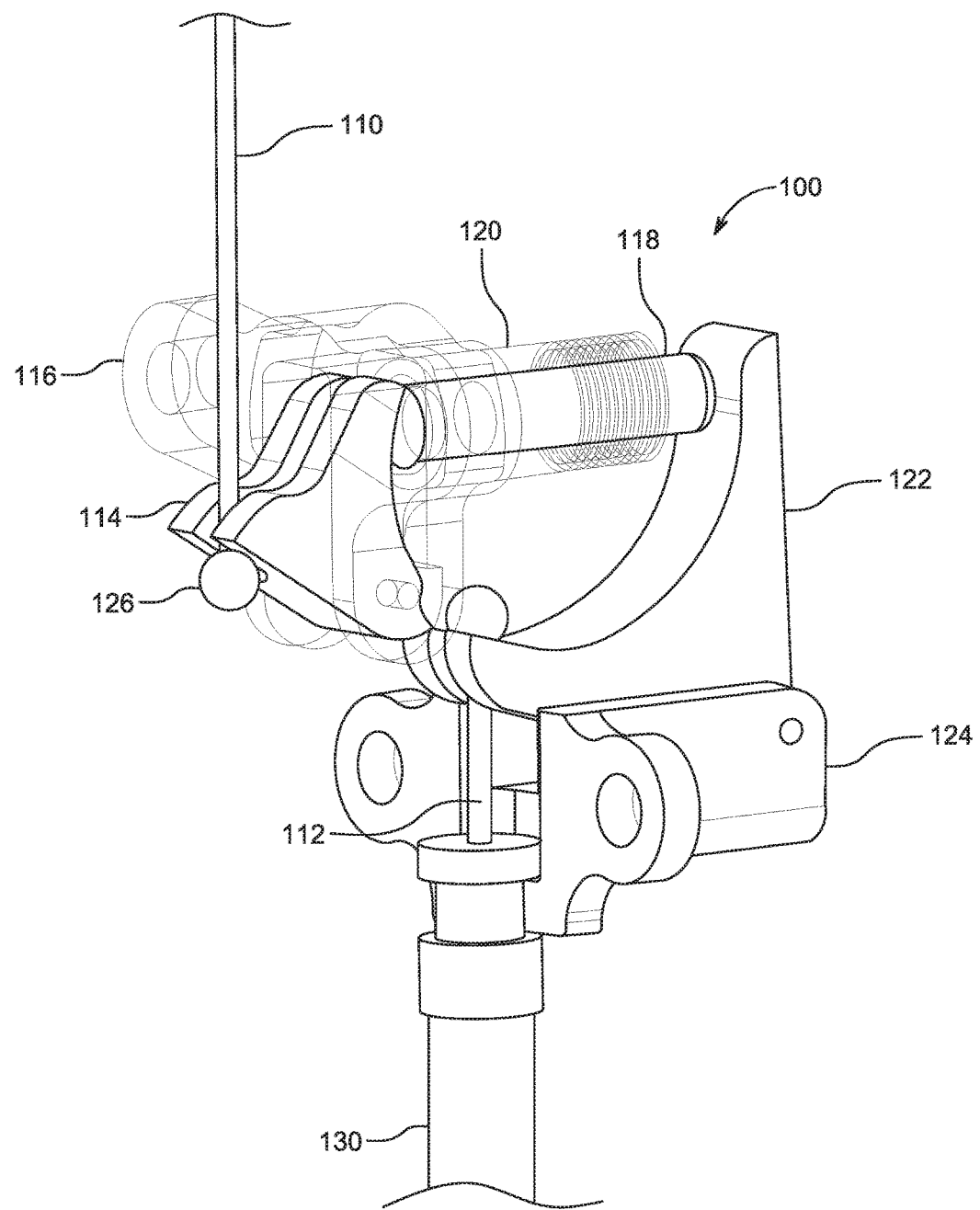
FIG. 4 is a fragmentary perspective view of the cable actuating mechanism shown actuated and with the rotating component in a second position.

FIG. 3 shows the first component 116 at an angle to the second component 124, wherein the angle may correspond to a lowered or deployed position of the armrest. FIG. 4 shows the first component 116 parallel to the second component 124, which may correspond to a raised or stowed position of the armrest.

Figure 5:
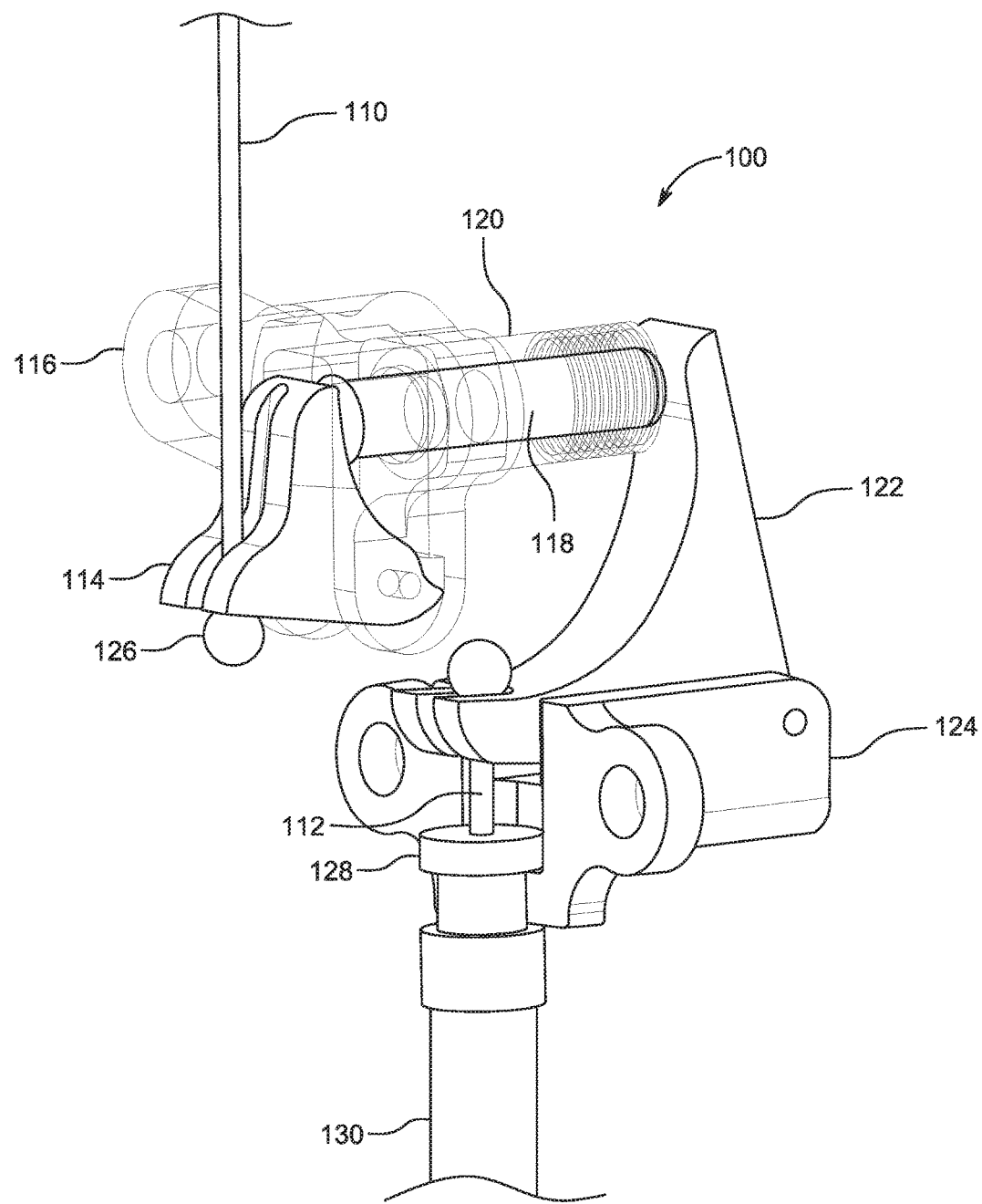
FIG. 5 is a fragmentary perspective view of the cable actuating mechanism shown unactuated and with the rotating component in the second position.

FIG. 5 shows the cable actuating mechanism 100 in an unactuated state wherein the first component 116 is parallel to the second component 124, which may correspond to a raised or stowed position of the armrest. In the unactuated state, both articulating cable actuators 114, 122 contact opposing ends of the floating pin 118; however, minimal or no force is exerted on the second articulating cable actuator 122. Thus, as shown in FIG. 5, the cable actuating mechanism 100 is in a "ready" state. The floating pin 118 may be at all times in contact with the first and second articulating cable actuators 114, 122 so that there is no "play" in the mechanism, and actuating the actuator translates first cable motion into second cable motion without delay. Any of the floating pin 118, first articulating cable actuator 114, and second articulating cable actuator 122 may be biased in a direction of the unactuated state of the cable actuating mechanism 100.

Figure 6:
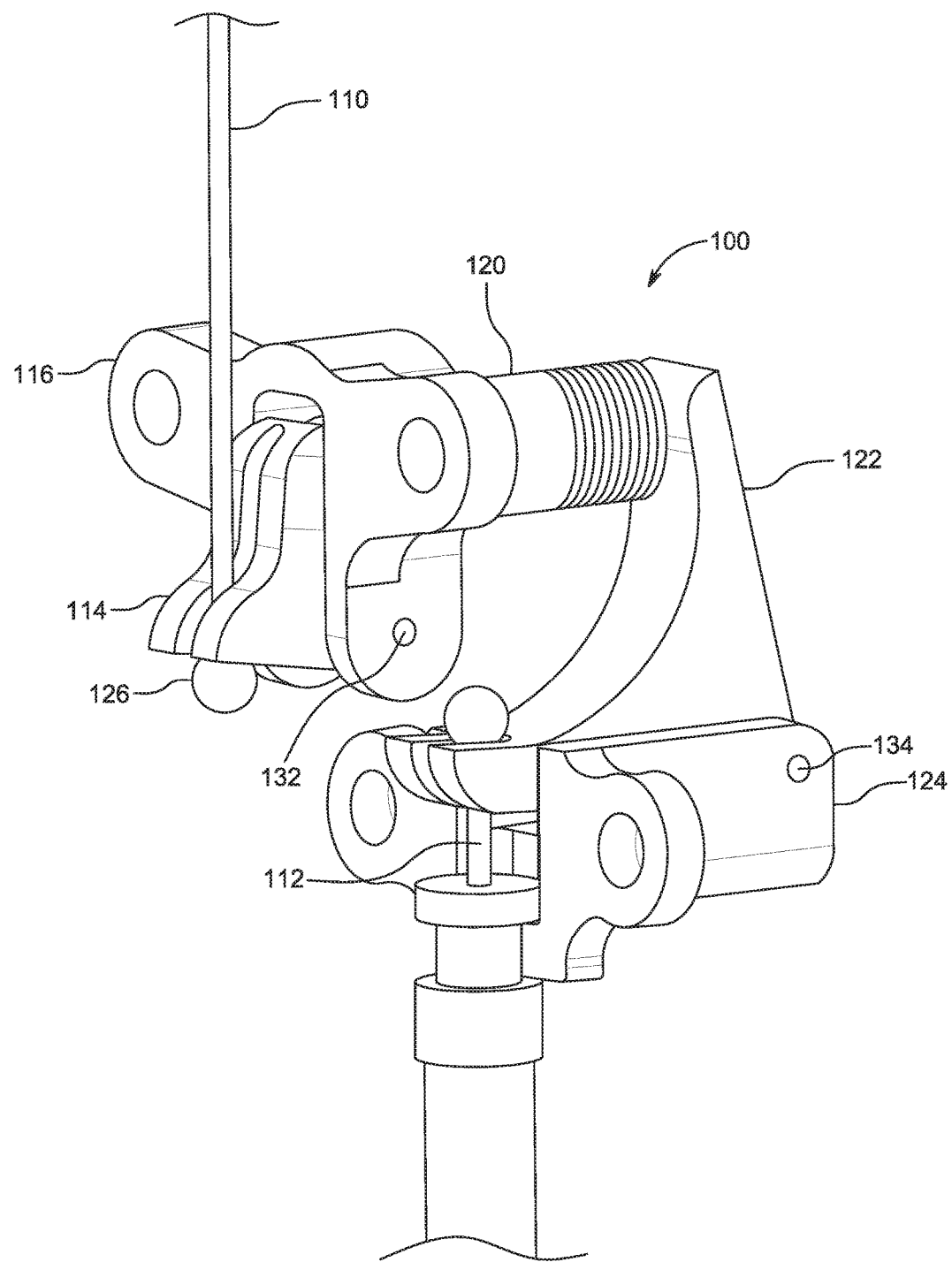
FIG. 6 is a fragmentary perspective view showing the cable actuating mechanism and pivot shaft.

FIG. 6 shows the pivot shaft 120 of the armrest, the pivot axis 132 of the first articulating cable actuator 114, and the pivot axis 134 of the second articulating cable actuator 124. FIG. 6 further show the cable actuating mechanism 100 in the unactuated or ready state and the first component 116 parallel to the second component 124, which may correspond to the raised or stowed armrest position.

Figure 7:
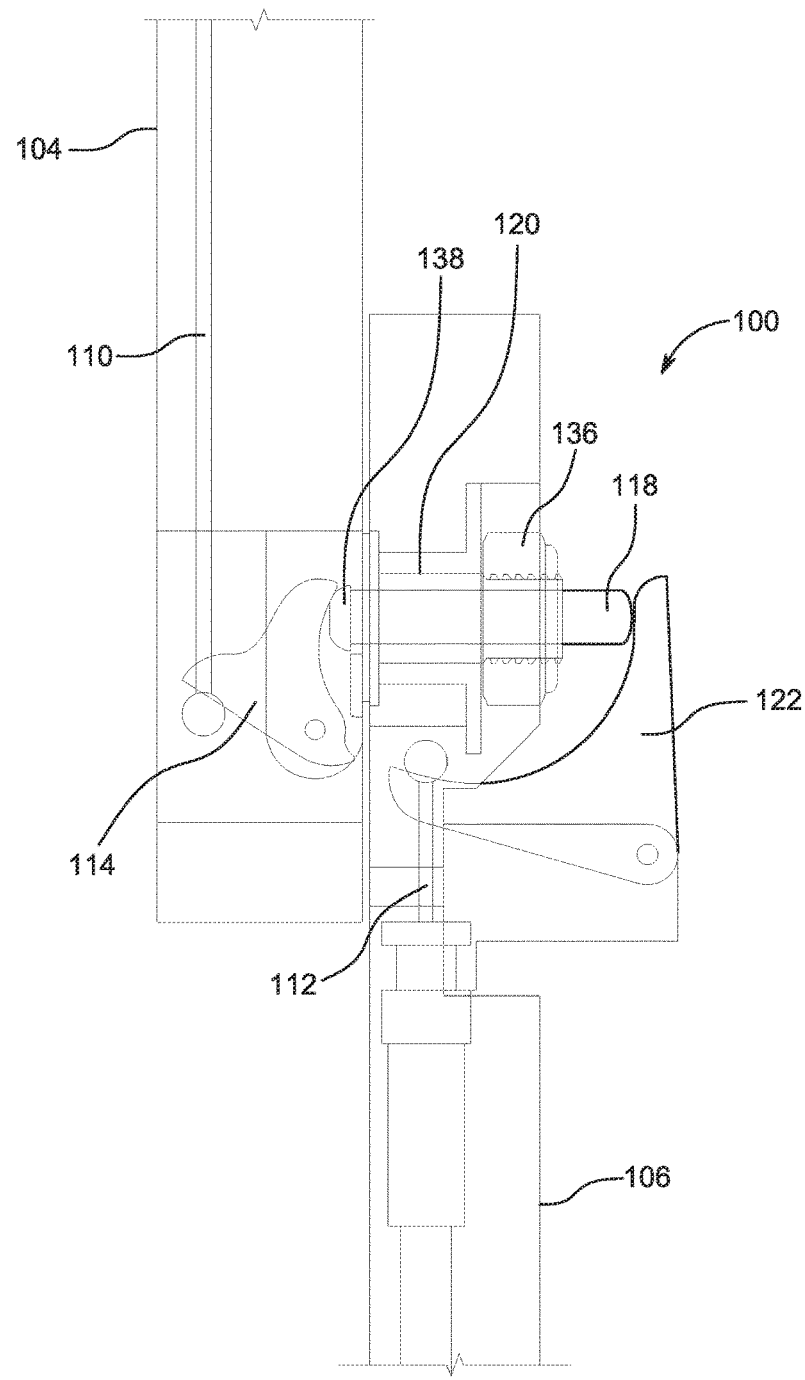
FIG. 7 is a side view showing the cable actuating mechanism actuated.

FIG. 7 shows a portion of a pivoting armrest assembly wherein the armrest 104 is shown in a substantially vertical orientation relative to the seat spreader 106. The cable actuating mechanism 100 is shown in the actuated state wherein the first cable 110 is pulled causing the second cable 112 to be pulled. Pivoting motion of the first and second articulating cable actuators 114, 122 can be limited using physical stops. A damper 136 can be incorporated, disposed about the pivot shaft 120, to dampen armrest pivoting motion and/or movement of the floating pin 118 toward the unactuated position. The floating pin 118 can terminate in an enlarged rounded head 138 to ensure smooth motion and continuous engagement with the first articulating cable actuator 114. The enlarged head 138 can also serve as a stop by way of contact of an inner end of the head with an armrest structure, thus determining the horizontal travel extent of the floating pin 118 in a direction of the second articulating cable actuator 122. Each of the first and second articulating cable actuators 114, 122, can have a curved profile about which the floating pin 118 engages through the range of pivoting motion the articulating cable actuators.

Figure 8:
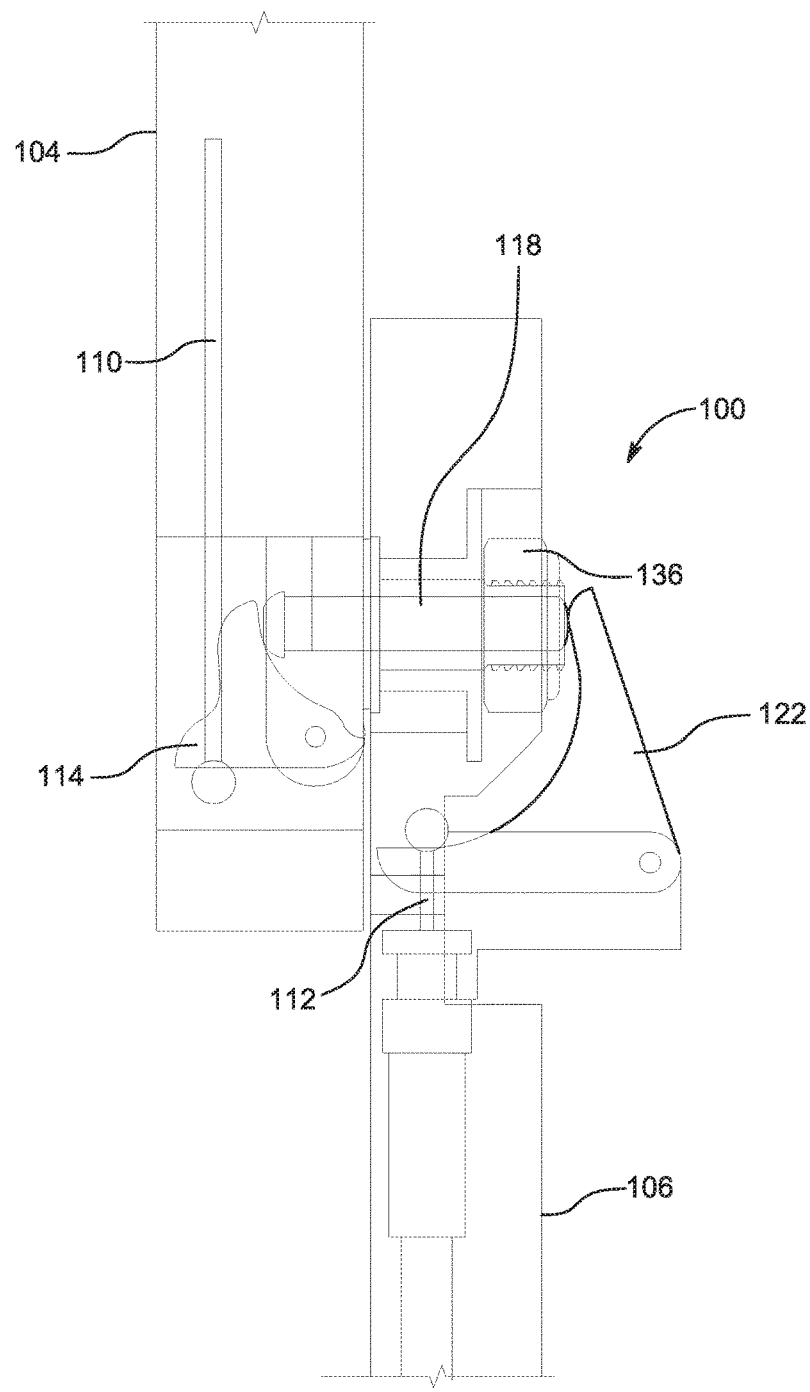
FIG. 8 is a side view showing the cable actuating mechanism unactuated.

FIG. 8 shows the pivoting armrest assembly wherein the armrest 104 is raised and the cable actuating mechanism 100 unactuated. FIGS. 7 and 8 further show that the first and second articulating cable actuators 114, 122 remain in contact with the opposing ends of the floating pin 118 in both the actuated and unactuated states of the cable actuating mechanism 100.

Figure 9:
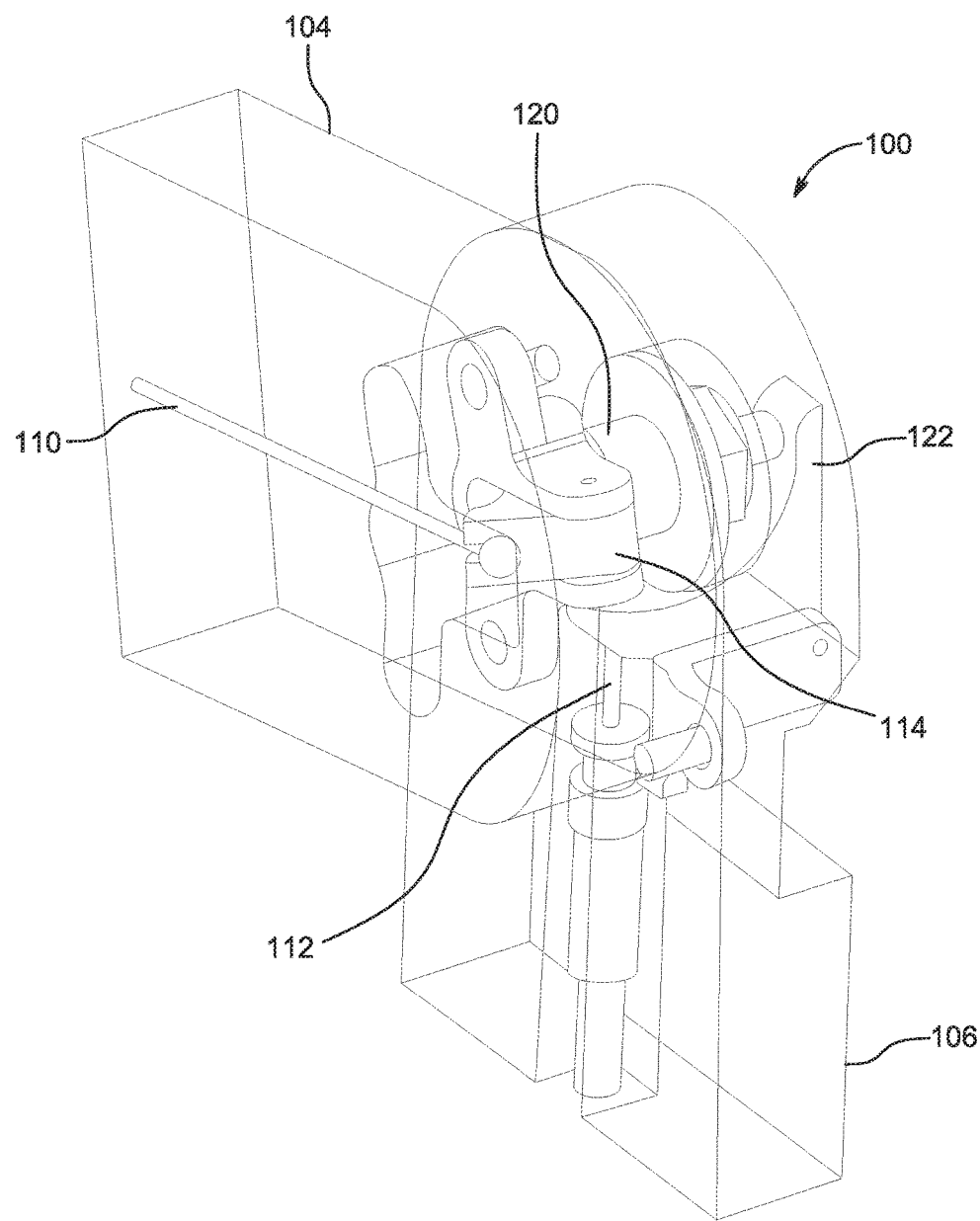
FIG. 9 is a fragmentary perspective view of a fixed component and a rotating component and the cable actuating mechanism shown actuated.
Figure 10:
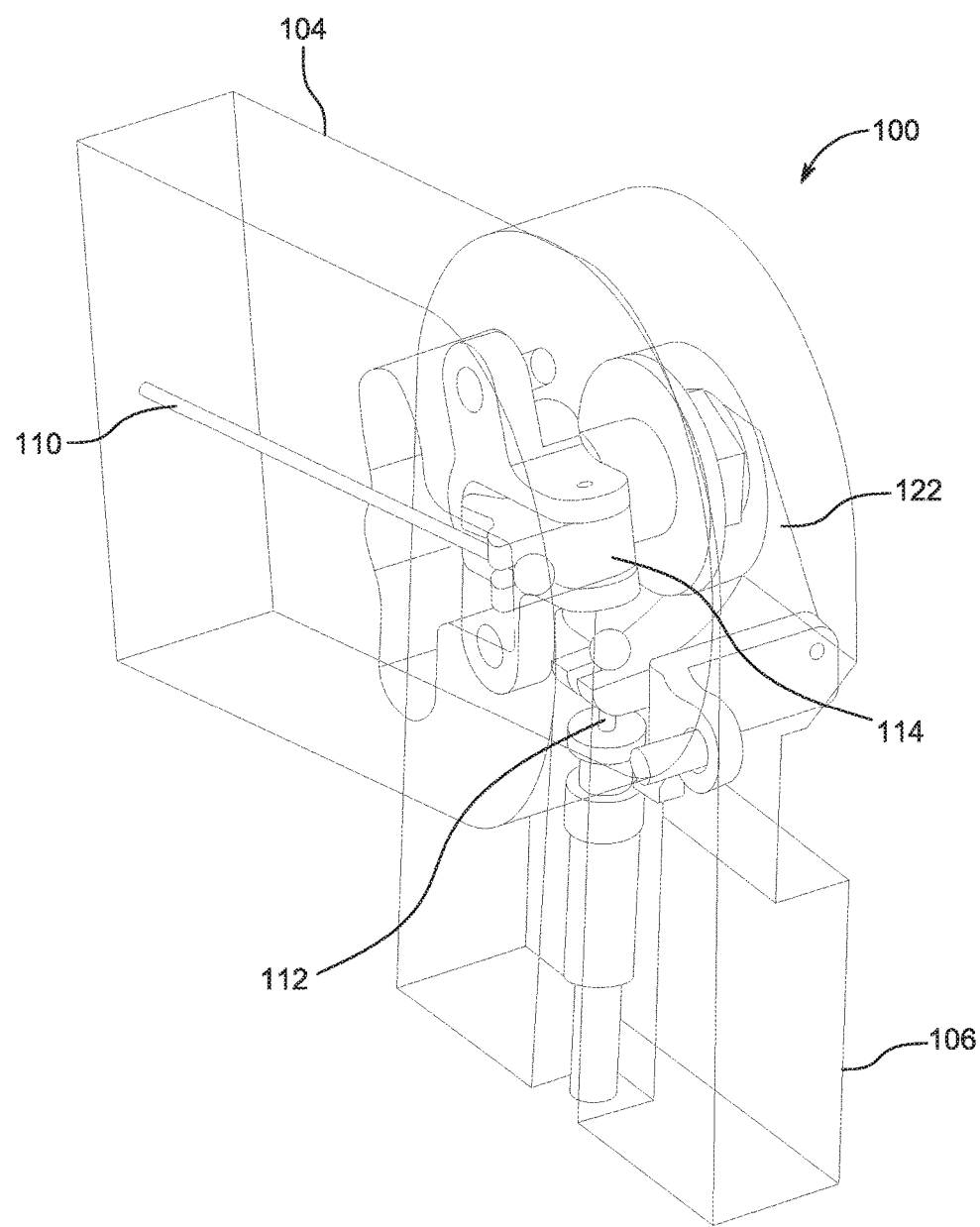
FIG. 10 is a fragmentary perspective view of a fixed component and a rotating component and the cable actuating mechanism shown unactuated.
Figure 11:
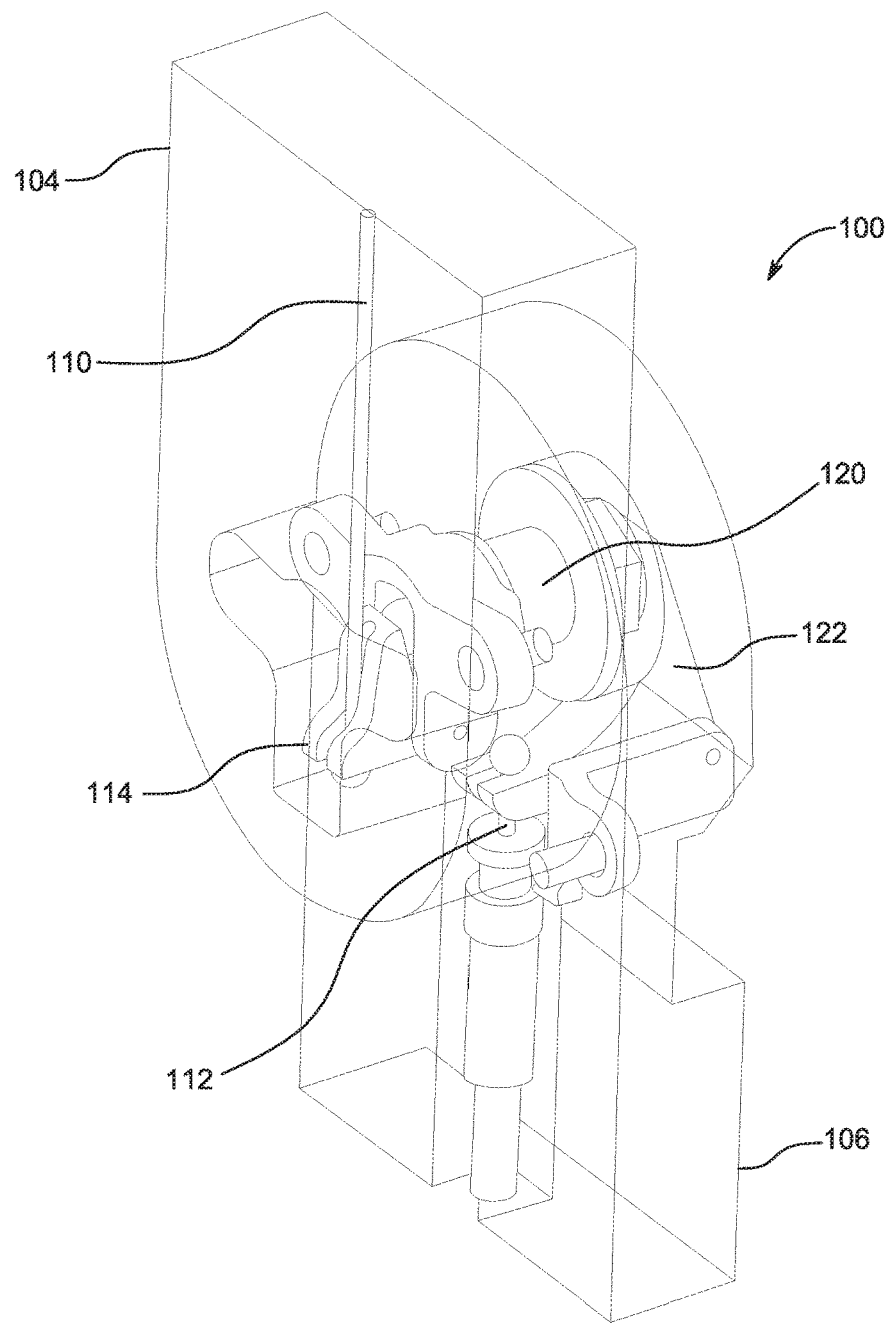
FIG. 11 is a fragmentary perspective view of a fixed component and a rotating component shown rotated and the cable actuating mechanism shown unactuated.

FIGS. 9 and 10 shows the armrest 104 in a lowered or deployed position and the cable actuating mechanism 100 in the respective actuated and unactuated states. FIG. 11 shows the armrest 104 in a raised or stowed position and the cable actuating mechanism 100 in the unactuated state.

Figure 12:
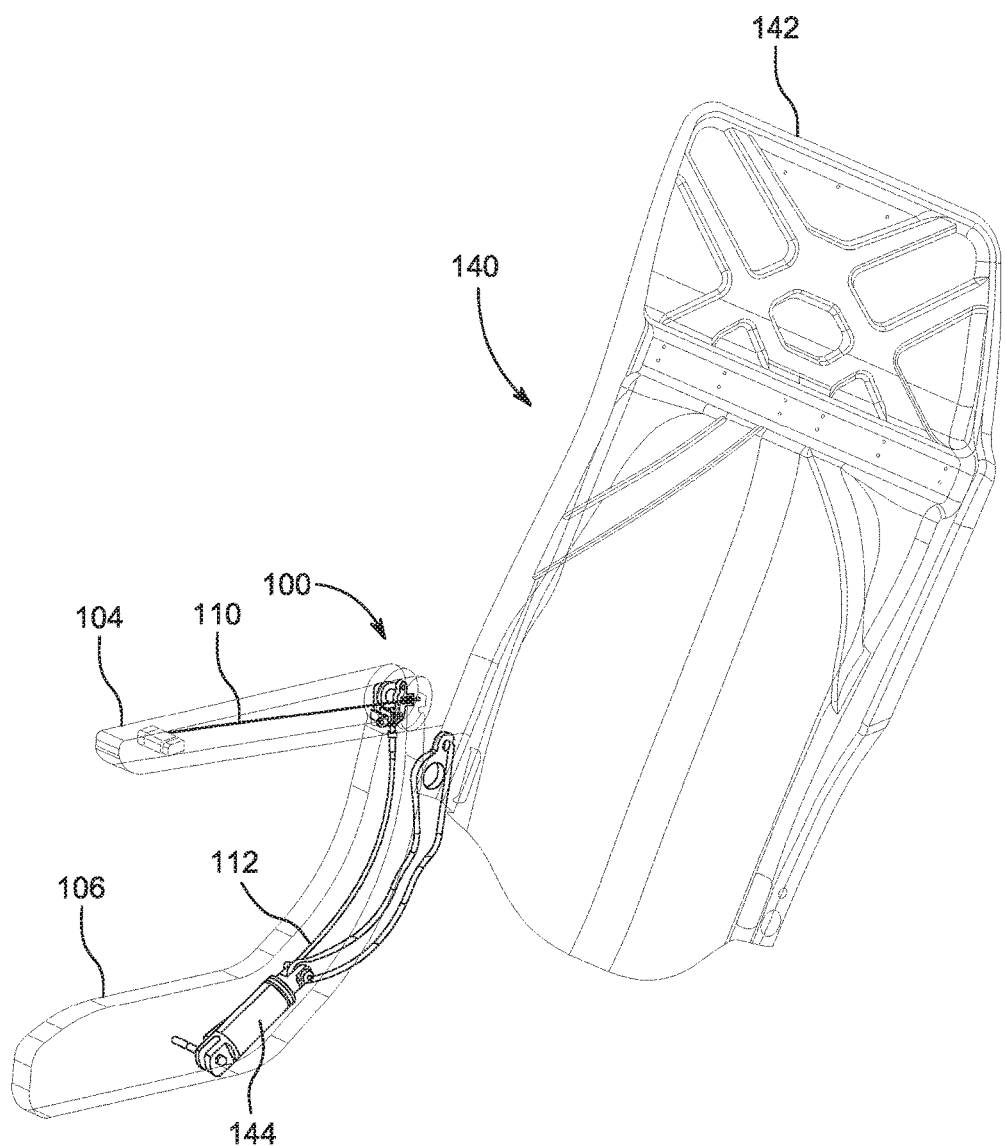
FIG. 12 is a fragmentary perspective view of a seatback shown reclined by releasing a seat recline lock device utilizing the cable actuating mechanism.

FIG. 12 shows a portion of an aircraft passenger seat 140 generally including a seatback 142. Seatback recline is achieved by way of the cable actuating mechanism 100 incorporated into the pivoting armrest 104 and stationary seat spreader 106. The cable actuating mechanism 100 actuates through the central pivot axis of the pivoting armrest 104. One articulating cable actuator is pivotably attached to the rotating armrest 104, and the other articulating cable actuator is pivotably attached to the stationary seat spreader 106, and both actuators contact the floating pin as discussed above.

In use, the first cable 110 on the armrest side of the mechanism is pulled, thereby articulating the armrest cable actuator attached to the first cable causing the floating pin to push into the articulating cable actuator on the seat spreader side of the mechanism, which in turn pulls on the second cable 112, effectively translating the motion from the first cable 110 into the second cable 112. The opposing end of the second cable, i.e., the cable end opposite the second articulating cable actuator, is coupled to a seat recline lock 144. The pull on the second cable 112, releases the seat recline lock 144, thereby allowing seatback recline.

Figure 13:
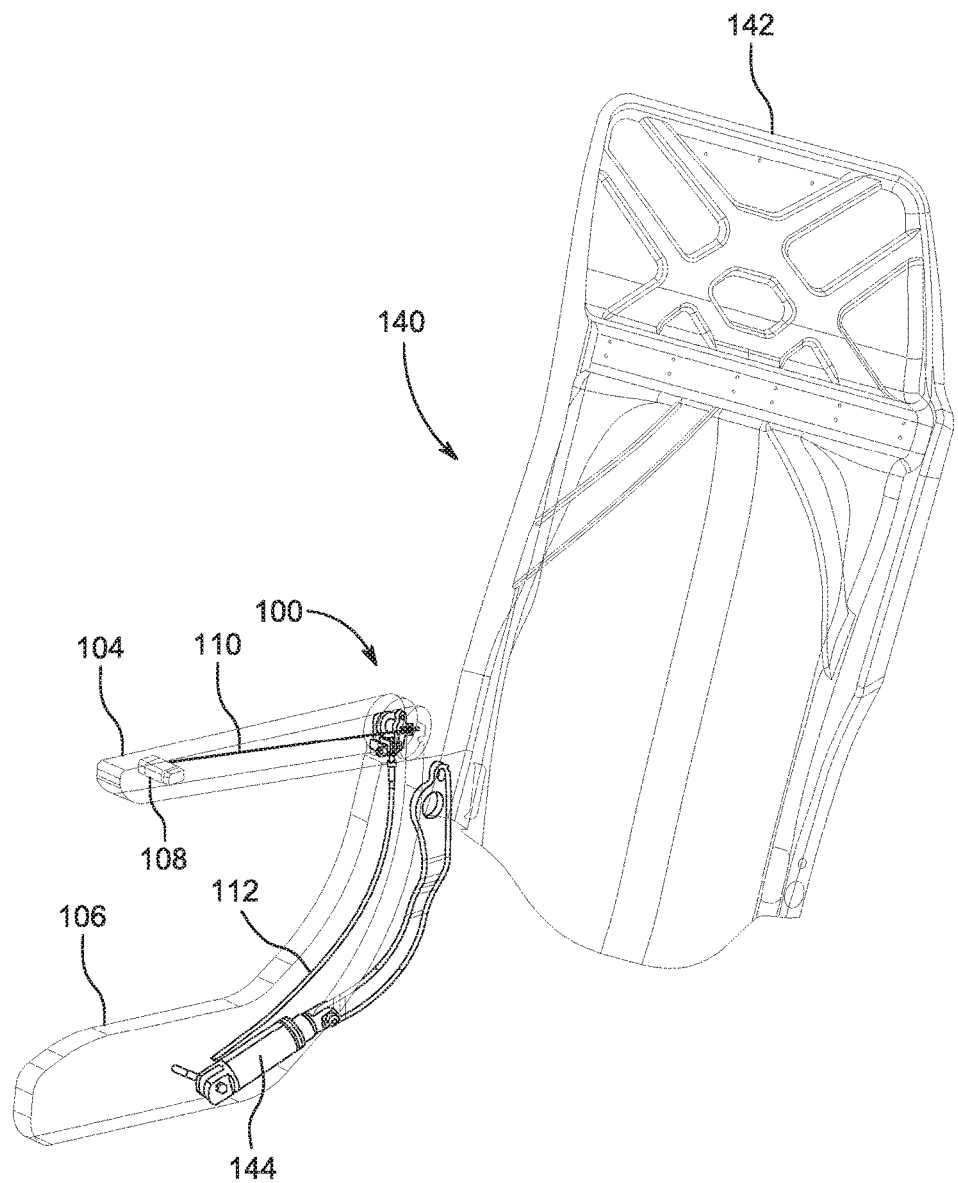
FIG. 13 is a fragmentary perspective view of the seatback shown upright.
Figure 14:
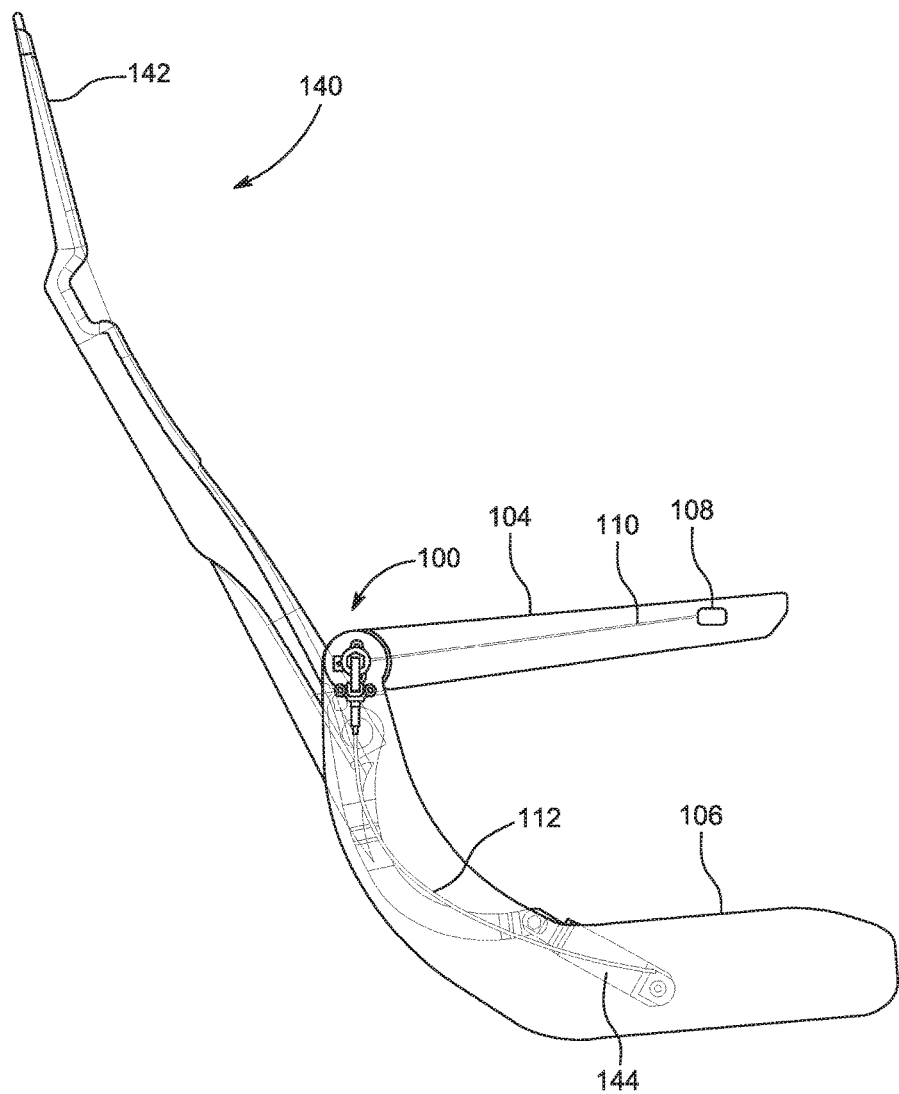
FIG. 14 is a side view of the seatback shown reclined.
Figure 15:
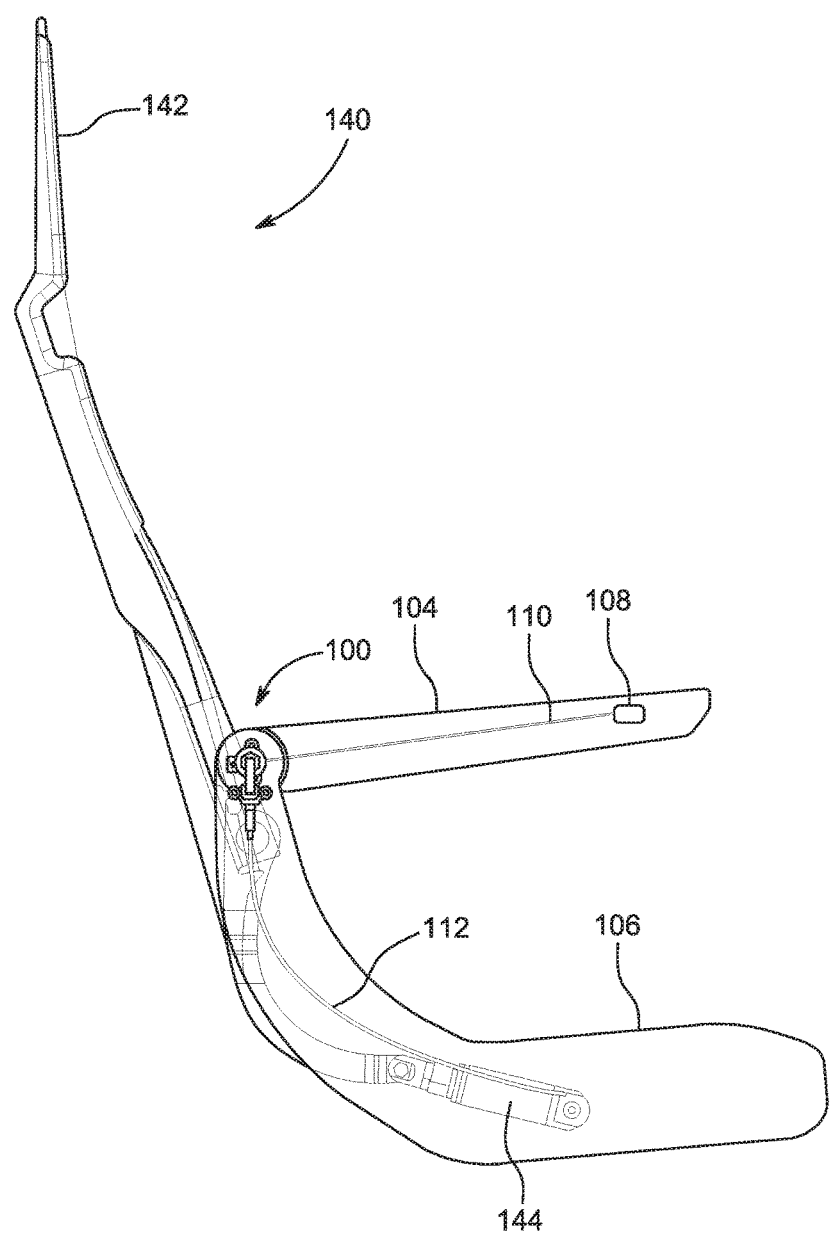
FIG. 15 is a side view of the seatback shown upright.

The seat recline lock 144 can be a mechanical actuator such as a hydraulic cylinder. A piston rod of the hydraulic cylinder can be released to allow the seatback to recline during flight, as shown in FIGS. 12 and 14. Seatback recline can be achieved by actuator the actuator 108, and maintaining the actuator in the actuated position thereof while urging the seatback toward the reclined position. The seatback can be returned to the upright sitting position, for example for taxi, take-off and landing, by actuating the actuator while leaning forward and allowing the stored force in the hydraulic cylinder to return the seat to upright, as shown in FIGS. 13 and 15.

The cable actuating mechanism can be utilized in an armrest pivot of an aircraft seat to achieve a total width across the rotating armrest and the stationary component less than 8 cm, more preferably about 5 cm. Other applications for the cable actuating mechanism described herein are envisioned including, but not limited to, any prior art single cable mechanism wherein the cable is routed around and outside of pivoting elements, and which can benefit from a split cable to reduce width, as well as fix both cable housings in place within their respective assemblies, thereby preventing damage or wear on the cable housings.

The foregoing description provides embodiments of the invention by way of example only. It is envisioned that other embodiments may perform similar functions and/or achieve similar results. Any and all such embodiments and examples are within the scope of the present invention and are intended to be covered by the appended claims.

What is claimed is:

1. A cable actuating mechanism, comprising:
a first articulating cable actuator affixed to a rotating seat component comprising a first cable coupled at one end to the first articulating cable actuator and at an opposing end to an actuator configured to apply a pulling force on the first cable;
a second articulating cable actuator affixed to a stationary seat component comprising a second cable coupled at one end to the second articulating cable actuator and at an opposing end to a device responsive to a pulling force on the second cable; and
a pivoting mechanism comprising a floating pin disposed through a center of a pivot shaft coupling the rotating seat component and the stationary seat component, the first articulating cable actuator contacting one end of the floating pin and the second articulating cable actuator contacting an opposing end of the floating pin such that pulling force on the first cable pulls the second cable to actuate the device;
wherein the actuator is a push button actuator, the rotating seat component is an armrest, the stationary seat component is a seat spreader, and the device is a hydraulic lock configured to unlock in response to pulling force from the second cable.

2. The cable actuating mechanism of claim 1, wherein pulling force on the first cable articulates the first articulating cable actuator to move the floating pin to articulate the second articulating cable actuator causing the second cable to be pulled.

3. The cable actuating mechanism of claim 1, wherein the first articulating cable actuator is pivotally attached to the rotating seat component and the second articulating cable actuator is pivotally attached to the stationary seat component.

4. The cable actuating mechanism of claim 1, wherein the pivoting mechanism further comprises a damper configured to dampen rotation of the pivoting mechanism.

5. The cable actuating mechanism of claim 1, wherein actuation of the cable actuating mechanism is consistent regardless of an angular position of the rotating seat component relative to the stationary seat component.

6. The cable actuating mechanism of claim 1, wherein the first cable is a jacketed cable, a naked cable, or a rod.

7. The cable actuating mechanism of claim 1, wherein the second cable is a jacketed cable and a jacket of the jacketed cable is fixed at one end to the stationary seat component.

8. An aircraft seat recline cable actuating mechanism, comprising:
a first articulating cable actuator affixed to a rotating armrest comprising a first cable coupled at one end to the first articulating cable actuator and at an opposing end to an actuator configured to apply a pulling force on the first cable;
a second articulating cable actuator affixed to a stationary component comprising a second cable coupled at one end to the second articulating cable actuator and at an opposing end to a seat recline lock device responsive to a pulling force on the second cable; and
a pivoting mechanism comprising a floating pin disposed through a center of a pivot shaft coupling the rotating armrest and the stationary component, the first articulating cable actuator contacting one end of the floating pin and the second articulating cable actuator contacting an opposing end of the floating pin such that pulling force on the first cable pulls the second cable segment to actuate the seat recline lock device.

9. The cable actuating mechanism of claim 8, wherein pulling force on the first cable articulates the first articulating cable actuator to move the floating pin to articulate the second articulating cable actuator causing the second cable to be pulled.

10. The cable actuating mechanism of claim 8, wherein the first articulating cable actuator is pivotally attached to the rotating armrest and the second articulating cable actuator is pivotally attached to the stationary component.

11. The cable actuating mechanism of claim 8, wherein the pivoting mechanism further comprises a damper configured to dampen rotation of the pivoting mechanism.

12. The cable actuating mechanism of claim 8, wherein cable actuation is consistent regardless of an angular position of the rotating armrest relative to the stationary component.

13. The cable actuating mechanism of claim 8, wherein the first cable is a jacketed cable, a naked cable, or a rod.

14. The cable actuating mechanism of claim 8, wherein the second cable is a jacketed cable and a jacket of the jacketed cable is fixed at one end to the stationary assembly.

15. The cable actuating mechanism of claim 8, wherein the pivoting mechanism further comprises at least one additional actuator for actuating a device having a function different from a function of the seat recline lock device.

16. The cable actuating mechanism of claim 8, wherein the actuator is a push button and the stationary component is a seat spreader.

17. The cable actuating mechanism of claim 8, wherein a total width across the rotating armrest and the stationary assembly is less than 8 cm.

18. The cable actuating mechanism of claim 8, wherein a total width across the rotating armrest and the stationary assembly is less than 5 cm.

* * * * *